Nov. 18, 1969  S. J. PERLMAN  3,478,952
BAG BOTTOM
Filed April 14, 1967

INVENTOR
SOL J. PERLMAN

BY Cushman, Darby & Cushman
ATTORNEYS

United States Patent Office 3,478,952
Patented Nov. 18, 1969

3,478,952
BAG BOTTOM
Sol J. Perlman, Baltimore, Md., assignor to Vac Pac Manufacturing Company, Inc., Baltimore, Md., a corporation of Maryland
Filed Apr. 14, 1967, Ser. No. 630,961
Int. Cl. B65d 33/22
U.S. Cl. 229—57          3 Claims

ABSTRACT OF THE DISCLOSURE

An improved method of adhering the bottom of heat shrinkable polyalkylene terephthalate film bags, such as those used to shrink package frozen turkeys, is disclosed. The bags are adhered at the bottom with two distinct adhesive bands. The inner band is a thermoplastic adhesive which allows a measure of "peelability and shock absorbability," whereas the outer adhesive band is a high strength thermosetting adhesive. The contained product may even be cooked within the bag.

BACKGROUND OF THE INVENTION

Polyalkylene terephthalate films have been known to the prior art, and have previously been used for packaging applications. When the term "polyalkylene terephthalate" is used in the present specification, it is to be understood to apply to polymeric linear terephthalate esters formed by reacting a glycol of the series $$HO(CH_2)_nOH$$

wherein $n$ is an integer of 2 to 10, inclusive, with terephthalic acid or a lower alkyl ester of terephthalic acid, wherein the alkyl group contains 1–4 carbon atoms, such as, for example, dimethyl terephthalate. The preparation of polyalkylene terephthalates is disclosed in U.S. Patent No. 2,465,319 to Whinfield and Dickson, the disclosure of which is hereby incorporated by reference. The most widely used and commercially attractive polyalkylene terephthalate material is polyethylene terephthalate, such as the product sold under the commercial trade name "Mylar." Polyethylene terephthalate is generally produced by an ester interchange between ethylene glycol and dimethyl terephthalate to form bis-2-hydroxy ethyl terephthalate monomer, which is polymerized under reduced pressure and elevated temperature to polyethylene terephthalate. The alkylene terephthalate polyesters may be readily formed into films, for example, by melt casting or by tubular blown film extrusion.

The polyalkylene terephthalate films which are used in the shrink packaging field are films which have been oriented and heat set at elevated temperatures and restrained shrinkage. Polyethylene terephthalate film in substantially amorphous form may be oriented, for example, by stretching the film substantially equally in both linear directions, generally about 2- to 3¼-fold. Generally, heat setting of the film is accomplished after the orientation and is accomplished while maintaining the film under tension at a temperature above 100° C.

The heat shrinkable polyester film produced from polyalkylene terephthalates is not "heat sealable," in the sense that that term is used in the packaging field. The adhesive force developed between contacting layers of the polyester film during heat sealing treatments is not of sufficient strength for shrink packaging applications. However, it should be realized that the heat shrinkable polyalkylene terephthalate films might be classified as heat sealable for other applications wherein different requirements prevail.

The prior art has produced polyalkylene terephthalate film bags for packaging applications by simultaneously applying the bottom seal adhesive and the longitudinal (back or side) seal adhesive to a flat sheet of the plastic film. The film sheet is then folded and thus adhered into the desired bag shape. Prior art polyalkylene terephthalate adhesives are disclosed by, for example, U.S. Patents 2,820,735, 2,961,365 and 3,022,192, the disclosures of which are hereby incorporated by reference. It is known to use a thermoplastic adhesive alone on the bottom of the bag and a thermosetting adhesive alone to form the longitudinal back seal of the bag. Due to the use of the thermoplastic adhesive alone on the bottom of the bag, the packager must reverse, e.g., turn inside out, the bag in order to obtain adequate bottom seam strength, which is an extra step. The use of thermosetting adhesives alone on the bottom seal of such bags proved commercially unsatisfactory for two major reasons. First, the bag was subjected to shock while loading the product, causing the bag to fail, because of poor shock absorbing characteristics. In packaging, the product is generally rammed into a bag and such bags had insufficient bottom edge "shock absorbability" and/or "peelability." By "peelability" is meant the ability of the adhesive to allow at least a portion of the polyalkylene terephthalate films at the adhered band to separate from one another without film tear. Second, after the product is placed in the polyester bag and the bag is closed at the top, the film is heat shrunk upon the contained article. The shrinking cycle develops quite high stresses in polyalkylene terephthalate films and has caused the prior art bags to tear when the adhesive had insufficient peelability.

The polyalkylene terephthalate film is a biaxially oriented film exhibiting very high shrink energies of at least 700 p.s.i., and usually 1000 p.s.i. or above, preferably about 1700 p.s.i., or even higher. Such films have been previously used in shrink packaging. The properties of shrink packaging polymeric films is discussed by Robert D. Lowry in "The Growth of Shrink Packaging," Modern Packaging Encyclopedia, pages 288 to 296, 1963 the disclosure of which is hereby incorporated by reference.

The polyalkylene terephthalate film bags produced by known methods have not been able to be used for cooking a contained food product, as the thermosetting adhesives did not have the requisite degree of "peelability" to withstand the resultant high film stresses, and the thermoplastic adhesives lost too much strength at the cooking temperatures. In general, an extended heating cycle at temperatures of 210° F. or above have caused failure in the known polyalkylene terephthalate film bags.

BRIEF DESCRIPTION OF THE INVENTION

The above disadvantages of the prior art polyalkylene terephthalate film bags in shrink packaging applications are overcome by the use of two adhesive bands at the bottom edge of the polyester film bag. The outer band, e.g., the band closest to the outer edge of the bag, is a thermosetting adhesive. The inner band, which may be adjacent to the outer band or may be spaced therefrom, is a thermoplastic adhesive. The outer thermosetting adhesive imparts the required strength and heat resistance to the adhered section or band, while the inner, thermoplastic adhesive imparts the desired "peelability," which allows the bag to absorb shock.

DESCRIPTION OF THE DRAWINGS

The invention will be more readily understood with reference to the accompanying set of drawings, wherein.

Figure 1:
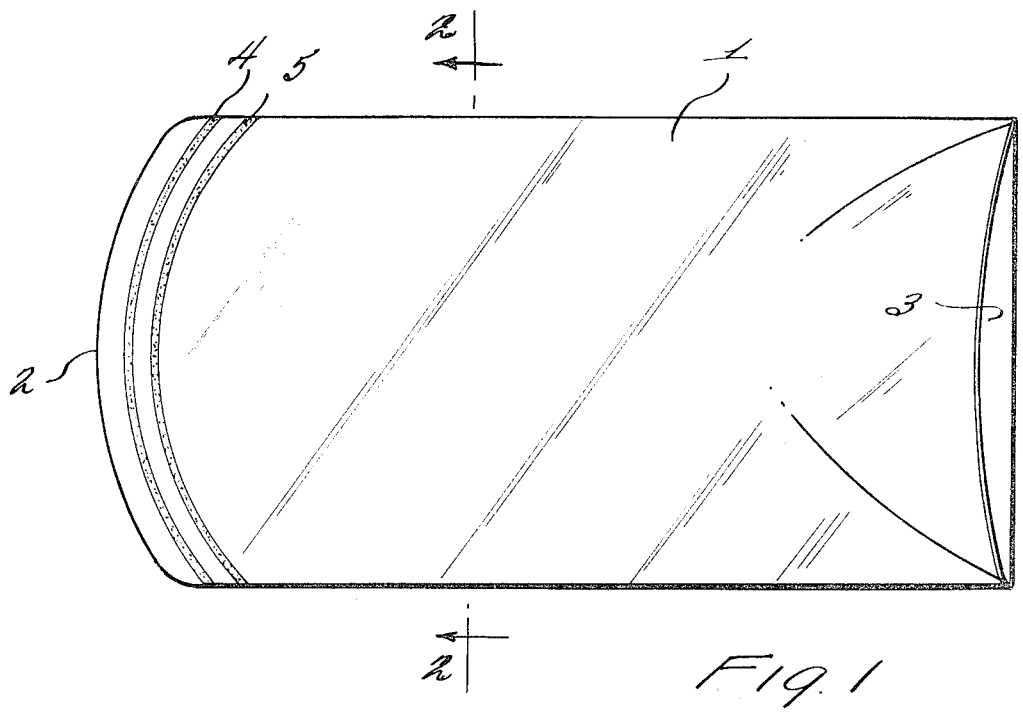
FIGURE 1 represents a side view of the polyalkylene terephthalate bag of the invention and FIGURE 2 represents a cross-section of the bag of FIGURE 1, taken along the line 2—2. 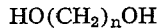 In FIGURE 1, a polyalkylene terephthalate bag 1 is shown which comprises a top 3 and a bottom 2. The bag is illustrated as formed from a tubular portion of polyalkylene terephthalate film, although the present commercial bags are formed from a flat piece of film by making a suitable longitudinal seam, as known of the art. The bottom of the bag is sealed by an outer adhesive layer 4 and an inner adhesive layer 5. The adhesive bands are shown as being separated from one another, but they may, if desired, be adjacent to each other.
Figure 2:
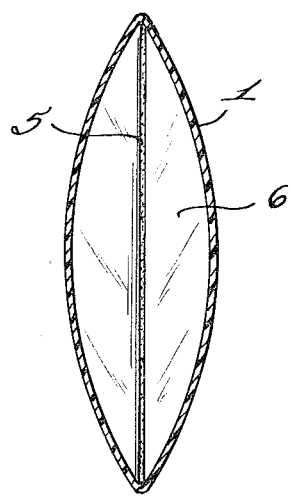

In FGURE 2, the bag 1 is shown in cross-section. Polyalkylene terephthalate film tube 6 is closed at one end (the bottom end) by means of an inner adhesive band 5 and an outer adhesive band 4 (not shown).

GENERAL DESCRIPTION OF THE INVENTION

The heat shrinkable polyalkylene terephthalate film bags of the present invention exhibit greatly reduced tendencies to tear and otherwise be adversely affected by mechanical shock and stresses caused by loading the product into a bag, by heat shrinking the bag around the contained product, or by subjecting the bag to extended heat treatment, such as, for example, subjecting the packaged product to immersion in boiling water to cook the contained product.

The key to the successful performance of the bags produced by the present invention resides in the "peelability" of the inner adhesive band and the high heat resistance and high cohesive strength exhibited by the outer adhesive band.

The inner thermoplastic adhesive band functions to absorb shocks imparted to the adhesive band and the outer thermosetting adhesive band functions to provide an adhesive area of high cohesive strength and high heat resistance. These bands may be of any desired width, and may be adjacent one another or spaced apart from each other. In the case of polyalkylene terephthalate film bags suitable for the packaging of frozen turkeys, it is preferred to use a 3/8" wide laydown of each adhesive layer and to have no space between the layers, e.g., the layers are adjacent. Generally, each adhesive layer or band will be at least 1/8" wide.

Polyalkylene terephthalate films are known to have high tensile strength but their tear resistance when subjected to shock, especially in the machine direction, is low. Therefore, the adhesive utilized must be capable of exhibiting a shock-absorbing ability during the heat shrinkage cycle, for otherwise the film will tear due to the high stresses involved.

The adhesive bands may be applied by any of the methods known to the art. For example, they may be applied by brushes or a flexographic press. Four rolls may be used to transfer the adhesive to a desired bag pattern. For instance, for round bottomed bags it has generally been desired to apply the adhesive in a sine curve laydown, whereas a straight laydown is generally used for flat bottomed bags. Other bag shapes and adhesive laydown patterns may be used in the practice of the present invention. It will readily be appreciated that the bags produced according to the present invention need not be reversed before packaging, as normally done, thereby allowing the bag to be printed on its outer surface either before or after the application of the adhesive layers.

After the bags are manufactured, the product may be loaded through the open end, and the bag then air evacuated and closed, for instance, by means of a metal or plastic clip, as known to the art, and then the bag may be shrunk upon the contained product, for instance by immersion in hot water baths, e.g., at 210° F. As mentioned, it is possible to cook food for any necessary length of time while the food is contained in the present bag. Polyethylene terephthalate films generally melt at a temperature of about 425° to 450° F. and generally the cooking temperatures should not be higher than 350° F. The ability to cook contained food products in polyalkylene terephthalate bags is unique, as far as known, to the bags produced by the present invention.

A wide variety of adhesives may be used in the practice of the present invention. The inner, thermoplastic adhesive may be any thermoplastic adhesive which exhibits adhesive characteristics to polyalkylene terephthalate films. Particularly preferred thermoplastic polyester adhesives, for example, are described in the Chapman U.S. Patent 3,142,434, the disclosure of which is hereby incorporated by reference. Among other thermoplastic adhesives may be mentioned, by way of example, and not of limitation, the polyamide adhesives disclosed in U.S. Patent 2,379,413, especially those of molecular weights of 6,000 to 9,000 and produced by the reaction of dimerized linoleic acid and ethylene diamine. Other thermoplastic adhesives for polyalkylene terephthalate are known to the art and may be utilized.

The outer thermosetting adhesive is generally a two component, or two can, system. Polyurethane and polyester adhesive are particularly preferred but any of the thermosetting adhesive for polyalkylene terephthalate films known to the art may be utilized. In general, the amount of catalyst when utilized in such a system must be closely watched in order to avoid gellation in the equipment involved. It is generally preferred to cure the thermosetting resin at a quite low rate. If desired, a modified isocyanate curing agent, may be added to polyester adhesives.

As a polyester adhesive there may be used, for instance, a styrene - modified polyethylene glycol - polypropylene glycol adipate-maleate, as is known to the art. The selection of a proper catalyst for any given thermosetting polyalkylene terephthalate film adhesive is within the skill of those in the art.

The invention will be understood more readily by reference to the following examples; however, these examples are intended to illustrate the invention and are not to be construed to limit the scope of the invention.

Example 1

Two adhesive bands were applied by way of a flexographic press to oriented heat shrinkable polyethylene terephthalate film 0.0005 inch thick, in a contour to give a round-bottom bag with a longitudinal center seal in one side. The inner band was 3/8 of an inch thick and was the polyester adhesive sold under the identification "469 68 polyester" by Du Pont (produced by the process of U.S. Patent 3,142,434). The outer adhesive was a thermosetting adhesive, based on a polyurethane resin. This was a two part adhesive system under the designation 712–602 and 713–806. The 712–602 material is a polyol composition exhibiting a Brookfield viscosity at 77° F. of 400–600 cps. at 25% solids in methyl ethyl ketone. The 713–806, which was used in an amount corresponding to 5% by weight of the 712–602, was a polyurethane prepolymer which was a 75% solid solution in methyl ethyl ketone, exhibiting a viscosity of that of a medium syrup. After 5 days aging at room temperature to insure cure of the adhesive band, the bag, which was of 16 inch lay flat width, was loaded with a turkey, vacuum evacuated and the open end was sealed by a metal clip. The bag was immersed in a hot water bath (at 180° F.) for 5 minutes thereby causing the film to shrink around the turkey. The packaged turkey was then frozen.

Example II

The frozen package turkey produced according to Example I was cooked in a pressure cooker at 250° F. for three hours, until done. Examination of the polyethylene terephthalate film showed no rips or tears in the bag and a tight adhesive band.

Example III

Example I was repeated except different adhesives were used. The inner, thermoplastic adhesive was prepared as follows: 30 parts of a copolyester having a relative viscosity of 1.6 prepared by reacting ethylene glycol with 33 mol percent dimethyl terephthalate, 17 mol percent dimethyl isophthalate and 50 mol percent dimethyl sebacate under ester-interchange conditions followed by polymerizing, were stirred together with 4.5 parts of triethyl citrate, 1.5 parts of "Syloid" 162 silica (10 micron silica, Davidson Chem.—W. R. Grace Co.) and 0.45 part of lauryl alcohol into a volatile organic solvent mixture consisting of 32.9 parts of methyl ethyl ketone, 3.5 parts of methyl isobutyl ketone and 21 parts of xylene.

The outer thermosetting adhesive was a two can polyurethane adhesive. One component consisted of a urethane prepolymer of toluene diisocyanate and a mixture of trimethylol propane and diethylene glycol adipate, the mixture having hydroxyl functionality of 2.5. The prepolymer contained 28% free NCO. The second component of the two can polyurethane adhesive was a polyol composition containing the reaction product of pentaerythritol with 5 mols of propylene oxide, together with triethylene diamine catalyst. The two components of the polyurethane adhesive were used in a proportion to give a final NCO:OH ratio of 1.05:1.0. The triethylene diamine was present in an amount equal to 0.5% by weight of the total adhesive composition.

The packaged turkey was examined after freezing and after cooking and the polyethylene terephthalate film exhibited no signs of rips or tears, and the outer adhesive band remained intact.

Example IV

Example III was repeated but in place of the polyurethane thermosetting adhesive was used a polyester thermosetting adhesive which was a styrene-modified polyethylene glycol-polypropylene glycol adipate-maleate. The final product produced by this example was similar to the product of Example III.

In a preferred form of the invention, the polyalkylene terephthalate film bag is heat sealed at the adhesive band to reduce the peelability of the thermoplastic adhesive. Such heat treated, or heat sealed, adhesive bands allow the production of bags which can withstand greater shocks.

The polyalkylene terephthalate film bags of the present invention are preferably used to package food products, most preferably turkeys, but it is to be understood that these bags may be used to package a wide variety of other items as well. When food items are packaged within the bags of the present invention, the food may be cooked in the bag itself, for example, by immersion in boiling water. In general, the cooking cycle will be at a temperature of about 210° F. to 350° F. and for at least ten minutes and until the product is cooked.

I claim:

1. A polyalkylene terephthalate film bag suitable for shrink packaging, said bag comprising oriented heat shrinkable polyalkylene terephthalate film in the shape of an open-end bag, at least the bottom of said bag being formed by adhering the polyalkylene terephthalate film to itself, the adhesive used to adhere said polyalkylene terephthalate film being the combination of (1) an inner band of thermoplastic polyalkylene terephthalate film adhesive and (2) an outer band of thermosetting polyalkylene terephthalate film adhesive.

2. The product claimed in claim 1 wherein said polyalkylene terephthalate film bag is polyethylene terephthalate film bag, and each adhesive band is at least ⅛″ wide.

3. The product as claimed in claim 2 wherein said thermoplastic adhesive is a thermoplastic polyester or polyamide polyethylene terephthalate film adhesive, and said thermosetting adhesive is a thermosetting polyester or polyurethane polyethylene terephthalate film adhesive.

References Cited

UNITED STATES PATENTS

| | | | |
|---|---|---|---|
| 2,880,925 | 4/1959 | Klassing et al. | 229—53 |
| 3,062,373 | 11/1962 | Reynolds | 206—65 |
| 3,204,760 | 9/1965 | Whiteford | 229—48 |

DAVID M. BOCKENEK, Primary Examiner

U.S. Cl. X.R.

229—48, 33